Figure 1:
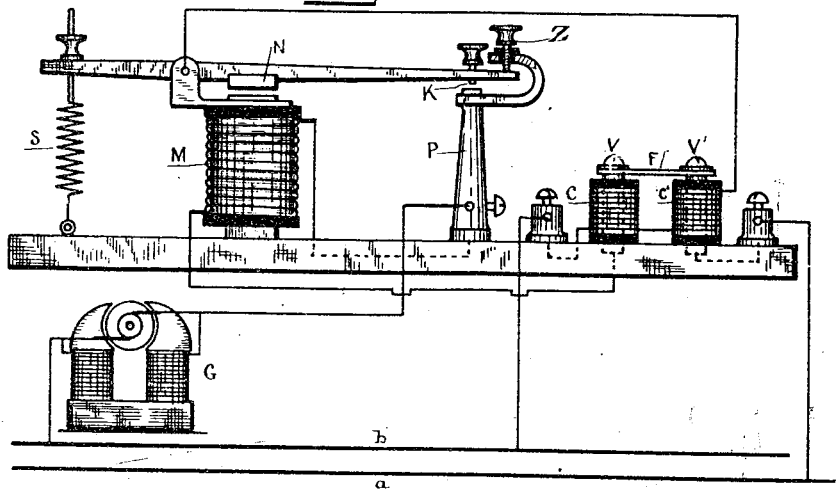

(No Model.) 2 Sheets—Sheet 1.

E. THOMSON.
SAFETY DEVICE FOR ELECTRIC MOTORS.

No. 476,330. Patented June 7, 1892.

WITNESSES:

INVENTOR
Elihu Thomson
BY
H. E. Townsend
ATTORNEY (No Model.) 2 Sheets—Sheet 2.
E. THOMSON.
SAFETY DEVICE FOR ELECTRIC MOTORS.
No. 476,330. Patented June 7, 1892.
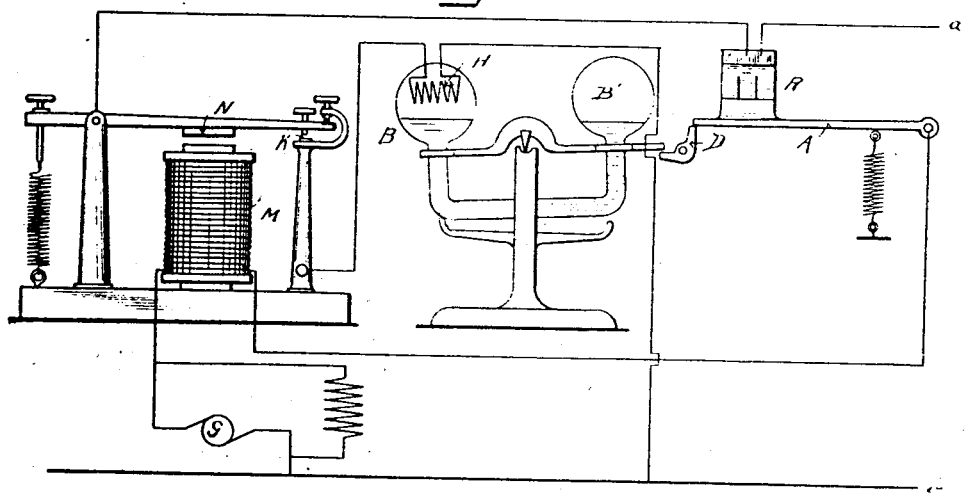
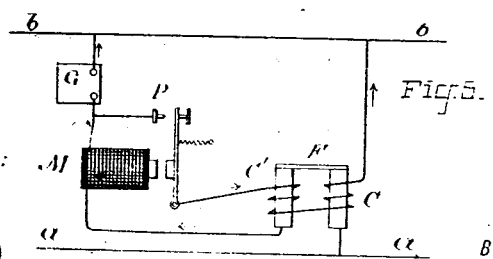
WITNESSES:
INVENTOR
Elihu Thomson
BY
H. C. Townsend
ATTORNEY.

UNITED STATES PATENT OFFICE.

ELIHU THOMSON, OF LYNN, MASSACHUSETTS, ASSIGNOR TO THE THOMSON HOUSTON ELECTRIC COMPANY, OF CONNECTICUT.

SAFETY DEVICE FOR ELECTRIC MOTORS.

SPECIFICATION forming part of Letters Patent No. 476,330, dated June 7, 1892.

Application filed October 16, 1889. Serial No. 327,234. (No model.)

*To all whom it may concern:*

Be it known that I, ELIHU THOMSON, a citizen of the United States, and a resident of Lynn, in the county of Essex and State of Massachusetts, have invented a certain new and useful Safety Device for Electric Motors and other Electric Apparatus, of which the following is a specification.

My invention relates to apparatus operated from constant-potential circuits and is designed to provide a means whereby such apparatus may be cut off from connection with the line when the apparatus, whether it be an electric motor or other apparatus, is overloaded or carries undue current, either through undue mechanical friction or from some defect which demands a large current, such as the disappearance or weakening of the counter electro-move force in the case of an electric motor fed from the constant-potential line or source. In such cases a simple fuse placed in the circuit does not entirely suffice, nor does an electro-magnetic cut-off or other safety device, responding immediately to an excess of current and opening the circuit to the motor, because in many instances during the operation of a motor it may be overloaded for a short time, causing an excess of current to flow through it, and yet this condition not be continued long enough to be a positive detriment to the machine, whereas the same condition of excess of current continued for fifteen or twenty minutes or more may result in the destruction of the motor by the burning of its insulation.

My invention introduces into the operation of a fuse or other cut-off or other safety device for motors or other apparatus fed from a constant-potential circuit the element of time in addition to the element of excess of current, whereby after a certain interval of overload and the production of an accumulated effect of the current, which interval and accumulation can be arranged in my improved cut-off to suit the conditions, the current will be cut off from the motor.

I employ as the first element of my invention a sensitive controlling device, responsive to an increase of current beyond a certain limit, such controlling device being placed in the branch from the constant-potential main with the device to be protected and being adapted to call into action the second element of my invention—namely, a device whose action is delayed or in which the effects of the abnormal flow of current as manifested by the controlling device requires to be accumulated for a definite or determinate time, or, in other words, a device delaying the ultimate action for a determinate period of time, dependent upon the time for which the apparatus may be subjected to abnormal current without injury, and, thirdly, a safety device, such as a switch or open circuiting or cut-off device as the last element of my invention, said third element being controlled by the action of the second element, or that wherein the accumulative effects are produced, whereby the motor may be thrown out of circuit and saved from injury.

Very many forms of apparatus may be employed, which may be classed under three elements mentioned. Thus an electro-magnet may be the first element, or a thermo-expansion device operated by the circuit, or coils arranged to attract or repel, or, in fact, any device such as would be used to respond to or indicate a certain strength of current passing such device, such as are employed in controllers or galvanometers, &c.

The second element consists of a coil or portion of an electric circuit thrown into circuit by the first element when it acts, which coil gradually heats up by its resistance to the current flowing, and after reaching a certain temperature brings by expansion, fusion, or other such thermic action a switch or the third element into operation. The heating effects of the current might also be accumulated by permitting the heat developed to operate so as to vaporize a liquid contained in a suitable receptacle, the vaporization resulting finally in the production of a gas or vapor in a confined chamber of sufficient tension to overset or produce a mechanical movement or shifting of a support, or the effects of the prolonged abnormal current flowing in the branch through the motor might be accumulated in any other desired manner, the apparatus being so set or adjusted that the prolongation should be a definite one, or one extended for some period somewhat less than that for which the apparatus may undergo the effect of the current without injury.

The third element of my invention may be a switch released by a detent, or a fuse in the circuit of the motor brought into a melting condition by the heat imparted to it in consequence of the action of the second device or element, in fact a cut-off device giving the properties of an electric switch or other protective device for preventing injury to the motor by excessive current and under the control of the second element of my invention.

Figure 2:
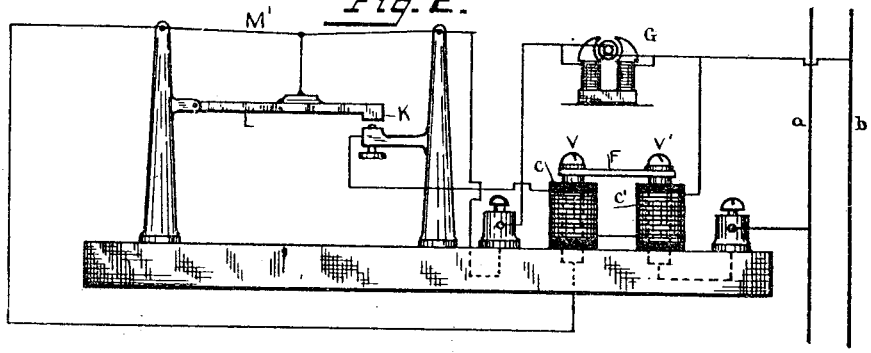
Figure 3:
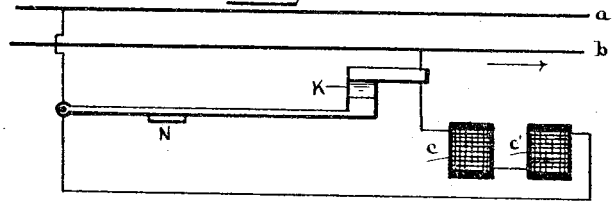

In the accompanying drawings, Figure 1 is a side view of an apparatus embodying my invention. Fig. 2 shows in side view a modification thereof; Fig. 3, one of a number of equivalent arrangements. Fig. 4 shows a modification of the invention. Fig. 5 is a diagram of the circuits, Fig. 1.

It will be understood that numerous modifications may be made in the devices used and their arrangement; but my invention is not in reality limited in any sense, but includes the elements mentioned and their substantial equivalents combined and adjusted as herein described.

In Fig. 1 the electro-responsive device is shown at M as an electro-magnet whose armature N is mounted on an armature-lever and is pulled against a retractile spring S, which may be made adjustable. The armature-lever carries a contact at K, which on the descent of the lever is brought against the pillar P, the back-stop Z being insulated.

F is a fuse-wire mounted between two pillars or supports V V' and connecting such supports electrically. The supports V V' for the fuse-wire are of metal and wound around with coils C C', but insulated therefrom. The coils C C' are arranged to be thrown into circuit upon the completion of the contact at K, and the current which then passes is sufficient to produce considerable heat, which heat is conducted to the parts V V', which the coils surround and which parts are made preferably of copper or good conductor of heat, the heat being carried from the coils to the fuse-wire F, so as to provoke its melting when the contact K is closed.

G symbolizes an electric motor. The magnet M and armature are adjusted so as not to act in closing contact until an abnormal current traverses the motor G from the constant potential or other line whose feeding wires or mains are represented by the letters a b. The apparatus is connected from the wire a to the fuse-wire post V', connection from such post being continued by the fuse-wire itself to the other V. Connection is taken from V to one terminal of the coils on the magnet M, the other connection or terminal being made to the pillar P, where it is shown attached to the wire leading from the motor G, the other terminal of the motor being connected, as shown, to the main or feeding wire b. The wire coils C C', which are made of fine wire, may be connected in shunt from a to b through the contact K when closed, as follows: from line b to C C', armature-lever which carries the armature N, and upper contact K, post P, and to a by way of coil M and fuse F. All parts of the apparatus are suitably insulated to prevent the existence of other circuits than those mentioned. It will be seen that the fuse F is in series with the motor G. The fuse F is adjusted to melt at once when a very excessive current flows through the motor G, but will not melt for small overloads if thrown on for a few minutes. If such slight overload were continued for hour after hour, the motor would be destroyed by accumulation of heat. The magnet M, however, is adjusted to respond at once to a considerable increase in the load or current traversing the branch in the line to the motor G. It then attracts its armature N, putting current through the coils C C', which again gradually heat the copper cores of the coils C C', and which heat finally reaches an amount which, in addition to that already produced in the fuse F by the current flowing through it, causes the melting of the fuse and the rupture of the circuit through the motor G. The three elements are then, first, the responsive electro-magnet M, acting on an overload, which magnet controls the second element or heating-coils C C', which introduces a time-factor for the completion of the actions, and, finally, the third element, called into action by the operation of the second element, as the fuse-wire F, which is a circuit-rupturing device or switch.

Instead of the magnet M any other device responsive to the action of electric current may be used. Thus, for instance, an expansible wire M', Fig. 2, may be arranged so that when heated by an undue current passing through it or otherwise affecting it it will expand and close a contact at K by allowing the contact-lever L to drop from the position shown. The contact at K, as before, controls the current admitted to the fine-wire coils C C', and the fuse F, as before, is caused to melt on the continuance of an abnormal load for a time sufficient to produce damage.

The devices, Figs. 1 and 2, in case the overload does not exist for a sufficient time to provoke the melting of the fuse F and the rupture of the circuit, will re-establish the original conditions by the opening of the contact K on the release of the armature N, as in Fig. 1, when the normal current flows in M, or by the contraction of the wire M', Fig. 2. Of course it is not necessary that the coils C C' be in circuit, as shown. They may be thrown into circuit in any other way and be fed from any source of current. In Fig. 3 they are shown as fed from the main-circuit, kept shunted by a contact K, until by the pull on the armature N, due to excessive current, as in Fig. 1, such contact K is opened, when the current at once traverses the coils C C' and warms them gradually and finally to the required degree when the adjustments have been properly made.

Fig. 4 shows an equivalent substitute for the coils C C', arranged to heat and form the cut-off F. The device, Fig. 4, depends upon the expansion of a fluid or gas by heat developed by an electric current, which, being allowed to act for a sufficient time by the electro-responsive device M, will finally shift a weight or do other work to sufficient amount or extent to bring about the operation of the cut-off affected or controlled by it.

B B′, Fig. 4, are communicating chambers or bulbs containing a fluid, such as in my meter patents Nos. 381,441, 381,442, and 381,443 of April 17, 1888, and pivoted so that a shifting of the weight of the liquid will tilt a lever. Bulb B contains heating-coil H, whose circuit is controlled by M. On closure of contact K the fluid will be gradually driven over to one side as the coil heats and vaporizes the same and the vapor under tension accumulates in the chamber at the left of the figure until finally the balance is overcome and the whole pivoted receptacle will be thrown over from the position shown to a position in which the right side of the structure is the lower. On the movement of the bulbs B B′ around the pivot on which they are suspended they may be made to throw a detent D from under the switch-lever A, whereby it may break contact at R. The switch-contacts R control the flow of current to the motor G, and when open cut off the supply. They are in series with the motor G and magnet M. This device is similar in operation to that of Figs. 1 and 2. A heating or expansion of fluid takes place instead of the effect on the coils C C′, which causes the opening of a cut-off, such as switch R, instead of the operation of a cut-off, such as a fuse F, which is melted, as in Fig. 1. The action will be readily understood from an inspection of the figure.

What I claim as my invention is—

1. The combination, with a constant-potential circuit, of a normally-closed branch therein, a translating device, and a protective device included in said branch, said protective device being responsive to abnormal current and being adjusted or constructed to open said branch circuit only after a predetermined time, dependent upon and within the period for which the translating device may carry the abnormal current without injury.

2. The combination, with a translating device in a branch from a constant-potential circuit, of an automatic circuit-interrupter in said branch responsive to abnormal currents therein, a derived circuit around said translating device assisting said circuit-interrupter, and an electro-responsive device in said branch circuit responsive to abnormal current for controlling said derived circuit.

3. The combination, with a motor in a branch from constant-potential mains, of a circuit-interrupter in said branch responsive to abnormal currents therein, a derived circuit for governing the operation of said circuit-interrupter, and an electro-responsive device in said branch controlling said derived circuit.

4. The combination, with a constant-potential main, of a branch containing a translating device, and a protector in said branch dependent for its action upon the accumulated effects of abnormal current prolonged in said branch beyond the period of the usual or ordinary fluctuations of current that if prolonged would injure the apparatus.

5. The combination, with an electric apparatus fed from a source of potential sufficient to damage the same, of an electro-responsive device adjusted to respond to excess of current in the said apparatus, a cut-off or protective switch for such apparatus, and a device responsive to the accumulated effects of the current, as described, and governed by such electro-responsive device and adapted to bring the cut-off into operation on a predetermined lapse of time, determined or limited by the period during which the apparatus may be subjected to the same excess of current without damage from heating.

6. The combination, with an electric apparatus, of a safety cut-out, an electro-responsive device connected to the circuits of the apparatus and adjusted to respond to abnormal-current strengths, and an electric heat-accumulator in which the heating effects of an electric current are absorbed or accumulated, as described, said heater being controlled by the electro-responsive device and being adjusted, as described, to bring the cut-off into operation only after the closure of circuit through the heater has been made for a prolonged period, determined by the time during which an abnormal current may flow without injury to the apparatus.

7. The combination, with an electric safety-fuse of conducting material, of an electric heater, to the heat-radiating effects of which said fuse is exposed, and an electro-responsive device governing the circuit of said heater and responsive to excessive current in the circuit to be protected.

8. The combination, with a safety-fuse in an electric circuit, of an electric heater in another circuit or branch of circuit and arranged in proximity to the safety-fuse, and an electro-responsive device governing the circuit of the heater and responsive to excessive current in the circuit of the fuse.

9. The combination, with the electric heating-coils, of a safety-fuse consisting of a piece of fusible conducting material included in an electric circuit and mounted on a heat-conducting support subjected to the heating action of said coils, as and for the purpose described.

Signed at Lynn, in the county of Essex and State of Massachusetts, this 8th day of October, A. D. 1889.

ELIHU THOMSON.

Witnesses:
J. WESLEY GIBBONEY,
A. L. ROHRER.